United States Patent Office 3,292,494
Patented Dec. 20, 1966

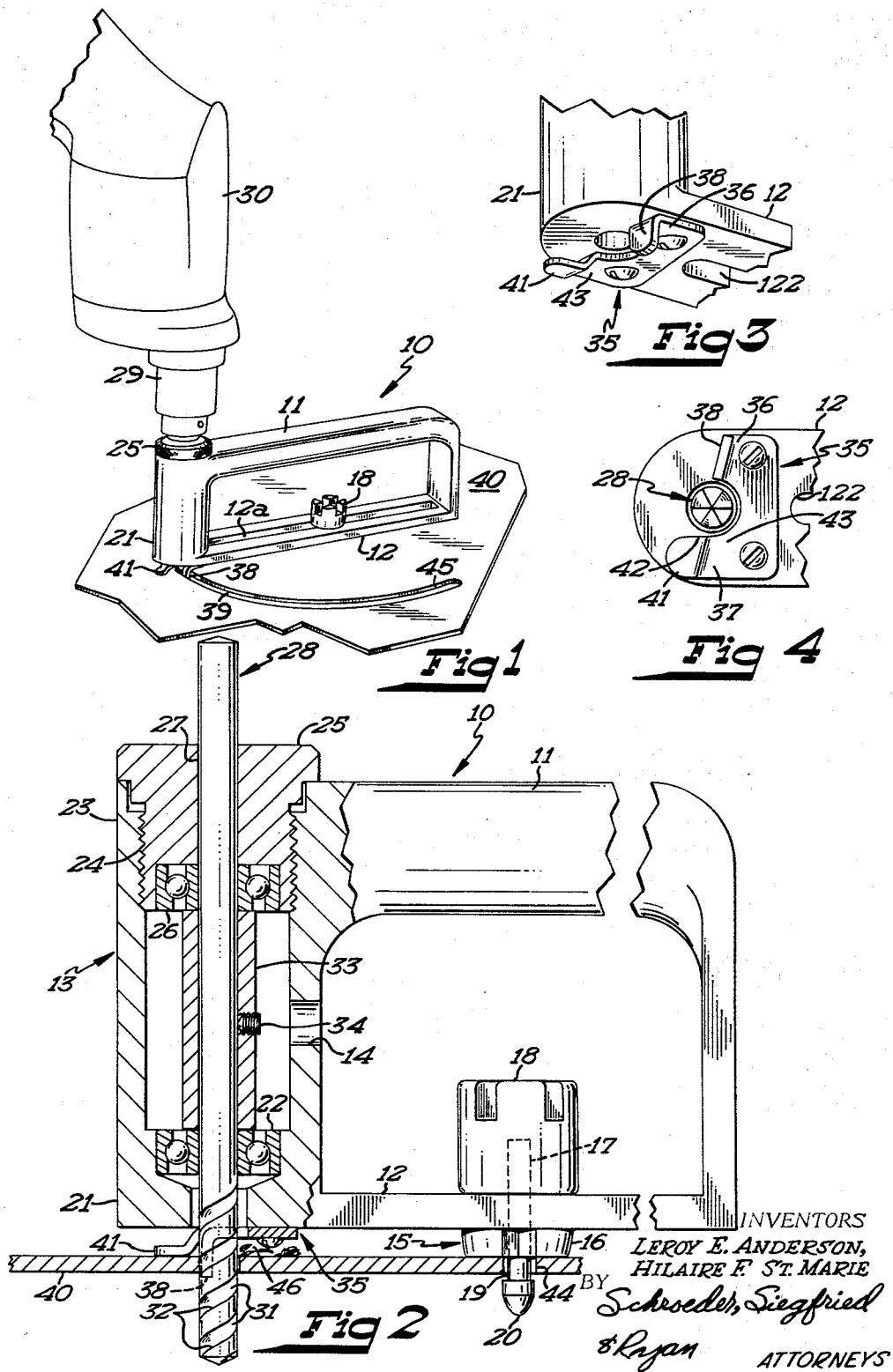

3,292,494
PORTABLE SHEET METAL HOLE CUTTER
Leroy E. Anderson and Hilaire F. St. Marie, Detroit Lakes, Minn., assignors to Snappy, Inc., Detroit Lakes, Minn., a corporation of Minnesota
Filed May 4, 1965, Ser. No. 453,140
10 Claims. (Cl. 90—12)

This invention relates to portable milling tools. More particularly, it relates to an improved portable hole cutter designed particularly for use in cutting a hole or opening a panel of material such as sheet metal such as is found is a wall of a plenum chamber.

Our invention constitutes an improvement on the portable sheet metal hole cutter disclosed and claim in U.S. Patent No. 3,146,675. Although the hole cutter shown in said patent has proved highly successful, the hole cutter disclosed and claimed herein constitutes a distinct improvement thereover.

It is a general object of our invention to provide a novel and improved portable sheet metal hole cutter of more simple and inexpensive construction and efficient operation.

A more specific object is to provide a novel and improved portable sheet metal hole cutter which operates with less friction, produces a smoother cut, eliminates binding of chips, and confines the heat to the milling cutter rather than to the cooperative cutting surface.

Another object is to provide a novel and improved hole cutter which can be manufactured more inexpensively and consequently sold at lower prices.

These and other objects and advantages of our invention will more fully appear from the following description, made in connection with the accompanying drawings, wherein like reference characters refer to the same or similar parts throughout the several views, and in which:

FIG. 1 is a perspective view showing one embodiment of our improved hole cutter applied to a sheet of metal and cutting a circular opening therein;

FIG. 2 is a side elevational view of the same with portions of the handle broken away and the cutter mechanism and sheet of metal shown in vertical section;

FIG. 3 is a fragmentary perspective view of the lower journal member with the bracket member which carries the cooperating cutter member and stabilizer surrounding the opening through which the milling cutter normally extends; and FIG. 4 is a fragmentary bottom elevation of the cutter mechanism carried at the outer end of the handle.

One embodiment of our invention, as shown in FIGS. 1–4, inclusive, includes a generally U-shaped handle indicated generally by the numeral 10 and having a pair of vertically spaced legs 11 and 12 which are connected at their forward end by a vertically extending rigid tube 13. The lower leg 12 is flat and has a longitudinally extending slot 12a formed therein. An adjustment opening 14 is formed in the wall of the tubular member 13 to permit adjustment of the milling cutter as will be hereinafter described. Mounted upon the lower leg 12 within the slot 12a is a pivot post 15 having a radially extending flange 16 immediately below the leg 12 and an upstanding threaded shank 17 which carries an internally threaded tightener nut 18 so that the pivot post 15 may be moved to any desired radius along the length of the leg 12. As best shown in FIG. 2, the pivot post 15 has a reduced portion 19 and a tapered head 20.

Mounted within the lower portion 21 of the tubular member 14 is a bearing 22 which together constitute a journal member. The upper portion 23 of the tubular member 13 is internally threaded as at 24 to threadedly receive an externally threaded plug 25 which carries a bearing 26 within its lower end and has a longitudinal bore 27 which is coaxial with the journal axis of the two bearings 22 and 26 when the plug 25 is threadedly engaged within the tubular member 13 as shown in FIG. 2.

Rotatably mounted for rotation about its longitudinal axis within the journals 21, 22 and 23, 25, 26 is an elongated milling cutter 28. As best shown in FIG. 2, this milling cutter 28 extends through the two journals and the two vertically spaced legs and has its upper end adapted to be engaged in driven relation by the chuck 29 conventionally carried by a motor 30 such as is conventionally used in drilling or cutting operations. The milling cutter 28, as shown, has a plurality of flutes 31 which define helical cutting edges 32.

Wherever herein the term "milling cutter" is utilized, however, it is intended to include all such cutting devices which bear helical cutting edges, irrespective of their number or angularity relative to the longitudinal axis, or type or use to which they are put.

A rigid sleeve 33 having a bore substantially equal to the outer diameter of the milling cutter 28 and having a length equal to the spacing between the two journals 21, 22 and 23, 25, 26 extends between the two journal members, as best shown in FIG. 2, and holds the milling cutter 28 against longitudinal shifting relative to the two journal members by means of an Allen type set screw 34. This screw 34 can be tightened or loosened, as desired, through the opening 14 and by means thereof, the extent to which the milling cutter 28 protrudes from the lower journal may be varied so that different portions of the flutes may be utilized for cutting operations after a particular portion thereof has become dulled. It will be noted that the milling cutter 28 is slidably mounted within the sleeve 33 and the two journal members but is held in fixed axial position relative thereto by the set screw 34. We have found that this simple and relatively inexpensive means for mounting the milling cutter 28 readily facilitates adjustment of the milling cutter and, at the same time, substantially reduces the cost of manufacture.

Mounted upon the lower journal member 21, 22 immediately adjacent the helical cutting edges 32 of the milling cutter 28 is a generally U-shaped bracket member 35. As best shown in FIGS. 2–4, inclusive, the bracket member has a pair of legs 36 and 37 which extend at opposite sides of the milling cutter 28. The one leg 36 terminates in a downwardly extending stabilizer element 38 which extends generally normal to the remainder of the leg 36 and generally radially of the milling cutter 28. This stabilizer element is designed to extend downwardly into the cut 39 made in a sheet of metal 40 as best shown in FIG. 1 so as to facilitate the cutting action of the helical cutting edges 32 as the cut is being made by stabilizing the entire assembly relative to the sheet of metal 40.

The opposite leg portion 37 has a terminal portion 41 which is vertically spaced relative to the journal 21, 22 and extends generally normal to the longitudinal axis of the milling cutter 28 and immediatey adjacent the helical cutting edges thereof. This terminal portion 41 constitutes a cooperative cutter member and has a cooperative cutting surface 42 which cooperates with the helical cutting edges 32 to effectively cut the sheet of material 40 as the handle 10 is swung about the pivot 15. The cooperative cutter surface 42, being disposed immediately adjacent the cutting edges 32, facilitates the cutting action while the member 41 maintains the sheet 40 in spaced relation to the journal 21, 22. Thus, the cooperative cutter member 41 defines a discharge area 43 therebehind so that the chips have a free escape immediately upon being cut free of the sheet of metal 40, as best shown in FIG. 2.

In use, the center of the opening which is to be cut is first determined and a hole such as 44 is drilled at that point. The pivot post 21 is then inserted in the center hole 44 and a second hole is drilled by the milling cutter 28. The handle member 10 is then swung about the pivot post 20 to quickly and easily form an arcuate cut such as is indicated by the numeral 45 in the sheet 40 and when the milling cutter 28 returns to the point at which the cut was commenced, a substantially truly circular piece will have been cut from the sheet 40. As the cut is made, the stabilizer 38 trails within the cut 45 with the result that a clean smooth cut is made by the cooperative cutting action of the cutting edges 32 and the cooperative cutter member 42 while the chips such as indicated by the numeral 46 are discharged behind the cutter member into the area between the cutter member and the journal 21, 22.

We have found that our improved hole cutter has distinct advantages in that it operates with substantially less friction since our hole cutter produces a smooth cut and consequently the rough edges which are normally provided by a tearing action and tend to bind are not present. Such rough edges create substantial friction and are difficult to handle manually and, in fact, may be dangerous since they are usually extremely sharp. Even more important, however, is the fact that our hole cutter eliminates the binding tendency of chips since the chips are discharged immediately subsequent to the cutting action and are not carried upwardly into the journal which supports the milling cutter. On the contrary, they are discharged immediately in the discharge area between the journal 21, 22, and the cooperative cutter member 41. Also, as a consequence of the cooperative cutter member being vertically spaced relative to the journal 21, 22, the heat is not transferred to the journal 21, 22 or to the cooperative cutting member 41 or, in the alternative, it is readily dissipated for we find that the journal and the cooperative cutter member 41 do not become unduly heated in contrast to the hole cutters previously known. In addition, it is important that the construction shown and claimed herein is substantially more simple and less expensive to manufacture and consequently this item may be sold at lower prices. We have found also, that by spacing the cooperative cutter member 41 vertically from the journal 21, 22, we have substantially eliminated the tendency of the milling cutter to tear the metal of the sheet 40.

It will, of course, be understood that various changes may be made in the form, details, arrangement and proportions of the parts without departing from the scope of our invention which consists of the matter shown and described herein and set forth in the appended claims.

What is claimed is:

1. A portable cutter for cutting out a section of a sheet completely therefrom by relative movement between the cutter and the sheet comprising:
    (a) a U-shaped handle member having a pair of vertically spaced leg elements;
    (b) a pivot post movably mounted on one of said leg elements and being adapted to be inserted into a hole in a piece of sheet metal to function as a pivot for said handle member about the hole;
    (c) a pair of spaced journal members one each of which is mounted upon the outer end portion of each of said leg elements and having a common journal axis;
    (d) a rigid sleeve member having a length substantially equal to the spacing between said journal members and extending between said journal members and aligned axially therewith;
    (e) a milling cutter extending through said sleeve and said journal members and being slidable axially relative thereto and being rotatably mounted within said journal members for rotation about its longitudinal axis;
    (f) said milling cutter having one end portion adapted to be connected in driven relation to a source of rotary power and having helical cutting edges carried by its opposite end portion extending outwardly beyond said journal members;
    (g) positive engagement means positively engaging said milling cutter and said sleeve and holding said milling cutter against axial movement relative to said sleeve and said journal members;
    (h) said enagement means being adjustable to permit said milling cutter to be shifted axially between fixed axial positions relative to said sleeve and said journal members;
    (i) a generally U-shaped bracket carried by the lower of said journal members adjacent the helical cutting edges of said milling cutter intermediate the ends thereof and having a pair of legs extending on opposite sides thereof;
    (j) one of the legs of said bracket member terminating in a stabilizer element extending away from said journal members and generally normal to the remainder of that leg and axially of said milling cutter and generally radially thereof;
    (k) the other leg of said bracket member terminating in a terminal portion offset axially of said milling cutter from the remainder of that leg in a direction away from said journal member and defining therewith a chip discharge area through which the chips will be discharged by the helical cutting edges of said milling cutter when a source of rotary power is applied to the latter and said cutting edges of said milling cutter are applied to such a sheet in cutting relation;
    (l) said terminal portion having a cooperative cutting surface cooperating with the cutting edges of said milling cutter and being spaced axially of said milling cutter relative to said journal members and being disposed immediately adjacent to the helical cutting edges of said milling cutter intermediate the ends thereof and effecting therewith a positive cooperative cutting action in a single plane upon a sheet of sheet metal when the rotating cutting edges of said milling cutter are applied to such a sheet.

2. A portable cutter for cutting out a section of a sheet completely therefrom by relative movement between the cutter and the sheet comprising:
    (a) rigid pivot structure adapted to pivot about a center point;
    (b) a pair of spaced journal members fixedly mounted on said pivot structure for pivotal movement therewith about such a center point and having a common journal axis;
    (c) a rigid sleeve having a length substantially equal to the spacing between said journal members and extending therebetween and being aligned axially therewith;
    (d) a milling cutter extending through said sleeve and said journal members and being rotatably mounted in the latter;
    (e) said milling cutter being slidable axially relative to said sleeve and said journal members;
    (f) said milling cutter having one end portion adapted to be connected in driven relation to a source of rotary power and having its opposite end portion carrying helical cutting edges extending outwardly beyond said journal members;
    (g) positive engagement means positively engaging said milling cutter and said sleeve for holding said cutter against axial movement relative to said sleeve and thereby relative to said journal members;
    (h) a generally U-shaped rigid bracket member carried by one of said journal members adjacent the helical cutting edges of said milling cutter and having a pair of legs extending on opposite sides thereof;
    (i) one of the legs of said bracket member terminating in a stabilizer element extending away from said journal members and generally normal to the remainder of that leg and axially of said milling cutter and generally radially thereof;

(j) the other leg of said bracket member terminating in a terminal portion offset axially of said milling cutter from the remainder of that leg in a direction away from said journal members and defining therewith a chip discharge area through which the chips will be discharged by said helical cutting edges of said milling cutter when a source of rotary power is applied to the latter and said cutting edges are applied to such a sheet in cutting relation;

(k) said terminal portion having a cooperative cutting surface cooperating with the cutting edges of said milling cutter and being spaced axially of said milling cutter relative to said journal members and being disposed immediately adjacent to the helical cutting edges of said milling cutter intermediate the ends thereof and effecting therewith a positive cooperative cutting action in a single plane upon a sheet of sheet metal when the rotating edges of said milling cutter are applied to said sheet.

3. A portable cutter for cutting out a section of a sheet completely therefrom by relative movement between the cutter and the sheet comprising:

(a) rigid pivot structure adapted to be pivoted about a fixed center point;

(b) journal means fixedly mounted on said pivot structure for pivotal movement therewith about such a center point;

(c) a milling cutter rotatably mounted in said journal means for rotation about its longitudinal axis and extending therethrough;

(d) said milling cutter having one end portion extending outwardly from said journal means and adapted to be connected in driven relation to a source of rotary power and having helical cutting edges carried by its opposite end portion extending outwardly beyond said journal means;

(e) a generally U-shaped bracket carried by said journal means adjacent the helical cutting edges of said milling cutter and having a pair of legs extending on opposite sides thereof;

(f) one of the legs of said bracket member terminating in a stabilizer element extending away from said journal means and generally normal to the remainder of that leg and axially of said milling cutter and generally radially thereof;

(g) the other leg of said bracket member terminating in a terminal portion offset axially of said milling cutter from the remainder of that leg in a direction away from said journal means and defining therewith a chip discharge area through which the chips will be discharged by said milling cutter when a source of rotary power is applied thereto and said cutting edges of said milling cutter are applied to such a sheet in cutting relation; and (h) said terminal portion having a cooperative cutting surface cooperating with the helical cutting edges of said milling cutter and being spaced axially of said milling cutter relative to said journal means and being disposed immediately adjacent to the helical cutting edges of said milling cutter intermediate the ends thereof and effecting therewith a positive cooperative cutting action in a single plane upon a sheet of sheet metal when the rotating cutting edges of said milling cutter are applied to such a sheet.

4. The structure defined in claim 3 wherein said stabilizer element extends a greater distance from said journal means than does said terminal portion of said other leg.

5. A portable cutter for cutting out a section of a sheet completely therefrom by relative movement between the cutter and the sheet comprising:

(a) rigid pivot structure adapted to be pivoted about a fixed center point;

(b) a milling cutter having one end portion adapted to be connected in driven relation to a source of rotary power;

(c) a journal means fixedly mounted on said pivot structure for pivotal movement therewith about such a center point and rotatably mounting said milling cutter for rotation about its longitudinal axis;

(d) said end portion of said milling cutter extending outwardly from said journal means at one side thereof and the opposite end portion of said milling cutter extending outwardly from the opposite side of said journal means and having helical cutting edges thereon;

(e) a cooperative cutter member carried by said journal means and mounted in spaced relation thereto axially of said milling cutter and defining a chip discharge area therewith through which the chips of the sheet will be discharged when said milling cutter is rotated by such a source of rotary power and applied to such a sheet in cutting relation;

(f) said cooperative cutter member having a cooperative cutting surface extending generally normal to the longitudinal axis of said milling cutter between the ends of said helical cutting edges and immediately adjacent thereto and effecting therewith a positive cooperative cutting action in a single plane upon a sheet of sheet metal when the rotating cutting edges of said milling cutter are applied to such a sheet.

6. A portable cutter for cutting out a section of a sheet completely therefrom by relative movement between the cutter and the sheet, comprising:

(a) rigid pivot structure adapted to be pivoted about a fixed center point;

(b) a pair of spaced journal members fixedly mounted on said pivot structure for pivotal movement therewith about such a center point;

(c) a milling cutter rotatably mounted within said journal members and extending therethrough and having one end portion adapted to be secured in driven relation to a source of rotary power and having an opposite end portion with helical cutting edges carried thereon extending outwardly from said journal members;

(d) a cooperative cutter member carried by one of said journal members and being disposed between the ends of said helical cutting edges and immediately adjacent thereto and effecting therewith a positive cooperative cutting action in a single plane upon a sheet of sheet metal when the rotating cutting edges of said milling cutter are applied to such a sheet;

(e) said cooperative cutter member being spaced axially of said milling cutter relative to said journal member carrying the same and defining an open discharge area therewith through which the chips of the sheet will be discharged when said milling cutter is rotated by such a soucre of rotary power and applied to such a sheet in cutting relation.

7. A portable cutter for cutting out a section of a sheet completely therefrom by relative movement between the cutter and the sheet comprising:

(a) rigid elongated pivot structure adapted to be pivoted about a center point;

(b) a single piece milling cutter extending through said pivot structure and transversely thereof and parallel to the axis of pivot thereof;

(c) said milling cutter having spiral cutting edges extending axially thereof with upper terminal portions;

(d) settable securing means extending transversely of the axis of said milling cutter and engaging and securing the same against substantial axial movement relative to said pivot structure while permitting rotational movement relative thereof; and (e) a work abutment member disposed below said pivot shaft and extending around said milling cutter and secured against substantial movement axially of said milling cutter, said work abutment member having an abutment surface disposed below said pivot structure and spaced vertically therefrom to hold such a sheet below the upper terminal portions of the cutting edges of said milling cutter and in spaced relation to said pivot structure.

8. A portable cutter for cutting out a section of a sheet completely therefrom by relative movement between the cutter and the sheet comprising:
   (a) rigid elongated pivot structure adapted to be pivoted about a center point;
   (b) a rigid sleeve supported by said pivot structure;
   (c) a single piece milling cutter extending through said sleeve and said pivot structure and having helical cutting edges extending axially upwardly from the lower end thereof which terminate in upper terminal portions;
   (d) settable securing means extending transversely of the axis of said milling cutter and engaging said sleeve and said milling cutter and securing the latter against substantial axial movement relative to said pivot structure while permitting rotational movement relative thereto;
   (e) a work abutment member disposed entirely below said pivot structure and extending around said milling cutter and being secured against substantial movement axially of said milling cutter;
   (f) said work abutment member having an abutment surface disposed below said pivot structure and spaced vertically therefrom to maintain such a sheet during the cutting operation in spaced relation to said pivot structure and below the upper terminal portions of said cutting edges of said milling cutter.

9. A portable cutter for cutting out a section of a sheet completely therefrom by relative movement between the cutter and the sheet comprising:
   (a) rigid pivot structure adapted to be pivoted about a fixed center point;
   (b) a milling cutter having one end portion adapted to be connected in driven relation to a source of rotary power;
   (c) journal means carried by said pivot structure in fixed position thereon for pivotal movement therewith about such a center point and rotatably mounting said milling cutter for rotation about its longitudinal axis;
   (d) said end portion of said milling cutter extending outwardly from said journal means at one side thereof and the opposite end portion of said milling cutter extending outwardly from the opposite side of said journal means and having helical cutting edges thereon;
   (e) a cooperative cutter member carried by said journal means and being disposed between the ends of said helical cutting edges and immediately adjacent thereto and effecting therewith a positive cooperative cutting action in a single plane upon a sheet of sheet metal when the rotating cutting edges of said milling cutter are applied to such a sheet;
   (f) said cooperative cutter member being spaced axially of said milling cutter relative to said journal member carrying the same and defining an open discharge area therewith through which the chips of the sheet will be discharged when said milling cutter is rotated by such source of rotary power and applied to such a sheet in cutting relation.

10. A portable cutter for cutting out a section of a sheet completely therefrom by relative movement between the cutter and the sheet comprising:
   (a) rigid pivot structure adapted to be pivoted about a center point;
   (b) a milling cutter having one end portion adapted to be connected in driven relation to a source of rotary power;
   (c) journal means carried by said pivot structure in fixed position thereon for pivotal movement therewith about such a center point and rotatably mounting said milling cutter for rotation about its longitudinal axis;
   (d) said end portion of said milling cutter extending outwardly from said journal means at one side thereof and the opposite end portion of said milling cutter extending outwardly from the opposite side of said journal means and having helical cutting edges thereon;
   (e) a cooperative cutter member surrounding said milling cutter and carried by said journal means;
   (f) said cooperative cutter member having a cooperative cutting surface disposed between the ends of said helical cutting edges and extending generally normal to the longitudinal axis of said milling cutter and immediately adjacent thereto and effecting therewith a positive cooperative cutting action in a single plane upon a sheet of sheet metal when the rotating cutting edges of said milling cutter are applied to such a sheet.

References Cited by the Examiner
UNITED STATES PATENTS 2,408,652  10/1946  King _____ 77—55 X
3,146,675  9/1964  Anderson _____ 77—77 X WILLIAM W. DYER, Jr., *Primary Examiner.*

G. A. DOST, *Assistant Examiner.*